Patented Sept. 20, 1932

1,878,276

UNITED STATES PATENT OFFICE

CHARLES ROBERTS HARRIS AND ARTHUR L. PITMAN, OF NIAGARA FALLS, NEW YORK, ASSIGNORS, BY MESNE ASSIGNMENTS, TO THE ROESSLER AND HASSLACHER CHEMICAL COMPANY, OF NEW YORK, N. Y., A CORPORATION OF DELAWARE

COMPOSITION OF MATTER

No Drawing. Application filed January 2, 1930, Serial No. 418,150. Renewed September 15, 1931.

This invention relates to the use of a warning agent for refrigerants escaped from refrigerating systems and more particularly from systems in which relatively inodorous refrigerants are used. In case of leaks in large refrigerating systems, such as multiple-unit, direct expansion systems in apartment houses, relatively high and dangerous concentrations of refrigerant in the air may result. If the refrigerant is not readily detected by its odor, persons breathing air containing it may not become aware of such leaks.

The object of our invention is to detect refrigerant escaped from refrigerating systems operating with relatively inodorous refrigerants by incorporating in the refrigerant a small proportion of allyl alcohol, the vapor of which irritates the membranes of the nose and eyes.

Substances having odorous or irritating properties have heretofore been incorporated in gases to enable leak detection. Practically any stable odorant or irritant with a sufficiently high vapor pressure may be used for such purpose. However, for use in a refrigerant, such a warning agent must possess special properties. It must not only have an appreciable vapor pressure at room temperature, but must also be readily soluble in the refrigerant at the lowest temperature occurring in the refrigerating system, have a freezing point below this temperature, be stable under conditions occurring in the system, have little or no corrosive effect on metals, and must not react with the refrigerant.

We have found that allyl alcohol possesses properties which make it especially suited for a warning agent in refrigerating systems. The proportions we have used range from about 1% to 4% by weight of the alcohol in the liquid refrigerant. This invention is, however, not limited to these proportions, as it is conceivable that other proportions would be satisfactory, especially under conditions other than those occurring in our experiments. In general, the best proportions for warning purposes depends on the nature of the refrigerant and the type of refrigerating machine. It may be desirable to produce a stronger warning effect with some refrigerants than with others and this may be done by increasing the allyl alcohol content. Various types of refrigerating systems may require different proportions of the warning agent; for instance the float-chamber type of compression refrigerator requires more allyl alcohol than the ordinary compression type. The proportions we prefer to use are two parts by weight of liquid allyl alcohol to 100 parts by weight of liquid refrigerant. The allyl alcohol may be introduced in any suitable manner, either before or after charging the system with refrigerant.

Refrigerants with which allyl alcohol may be used as a warning agent comprise those which readily dissolve this substance at the lowest temperature occurring in the refrigerating system, and which do not react with it. Thus, allyl alcohol may be used with such refrigerants as methyl chloride, ethyl chloride and other halogenated hydrocarbons, and propane and other hydrocarbons.

Allyl alcohol may be used satisfactorily as a warning agent, for example, in a refrigerating system employing methyl chloride as refrigerant. By means of our invention, persons exposed to concentrations of 0.1% by volume, or even less, of methyl chloride in air are quickly warned of its presence. The invention therefore provides a means for warning persons of concentrations of this substance which are far less than any which would endanger the health if exposure is limited to any reasonable time.

When refrigerant containing about 2% of allyl alcohol accumulates in a room, an occupant first feels the symptoms of a head cold and the nose becomes congested. At a concentration of 0.02% by volume of refrigerant in the air, no other sensations are usually experienced, even on continued exposure. When the person leaves the room, the sensation quickly disappears. At 0.05% by volume of refrigerant in the air, the allyl alcohol causes a stinging sensation in the nose which is entirely different from the nasal irritation accompanying a cold. Clearing the nostrils makes the irritation more pronounced. At a concentration of 0.1% of refrigerant in the air, irritation of both the nose and eyes usually occurs in less than two minutes. After 3 to 6 minutes, the irritation is very strong.

A particularly good feature of this warning agent is that the irritant effect not only occurs substantially immediately but that it becomes greater, the longer the exposure. The nasal irritation is more pronounced if the membranes are cleared. A further advantage is that the same warning effect results from leaks from the high and low pressure sides of a compression type refrigerating system, showing that the allyl alcohol does not accumulate in any part of the system to such a degree as to render its action ineffectual. That this warning agent has no harmful effects when used in the proper proportions, is evinced by the fact that no injurious effects were suffered by persons engaged in testing its warning properties.

Example 1

A household refrigerator was charged with 360 cc. of lubricatting oil, one hundred parts by weight (700 gms.) of methyl chloride and two parts by weight (16.5 cc.) of allyl alcohol and the machine was operated for two days. A measured amount of the mixture was then removed from the low-pressure side of the machine and the vapor discharged into a closed test room, to produce a concentration of 0.1% by volume of methyl chloride vapor in the air. After the air of the room had been agitated by a fan for fifteen minutes, two observers entered. The first observer felt a sharp prickling is the nostrils in one minute. In two minutes his eyes were irritated. In 2.5 minutes the eyes watered and in 4.5 minutes the irritation of nose and eyes, the latter now watering freely, was so strong that he left. The second observer entered with the first. He felt irritation of the eyes and nose within one minute, which irritation became steadily more pronounced until he was forced to leave in six minutes. In both cases the warning was pronounced very strong. Two other observers then entered the room. The irritation was so strong that they left in three to four minutes.

Example 2

The refrigerant was measured and introduced into the test room as in Example 1, to produce a methyl chloride concentration of 0.1% in the air, except that in this case the refrigerant was removed from the high-pressure liquid line of the machine. After the air in the room had been agitated by the fan for 15 minutes, an observer entered. In one minute, a stinging sensation was felt in the nose which extended back to the rear of the mouth. In two minutes, the nose was cleared which made the stinging sensation immediately thereafter more pronounced. In two and one-half minutes, the nose became slightly irritated. In five minutes, the eyes started to water. In five and one-half minutes, the irritation of the nose was so strong that the observer was forced to leave the room. Immediately after leaving the room, irritation of the nose stopped, though some watering of the eyes and nose continued for a short time.

Although allyl alcohol used with a float chamber type of refrigerator does not produce such a sensitive warning as when used in a machine not having a float chamber, this irritant, properly used, is nevertheless an effective warning agent when used in the float chamber type of machine, as the two following examples show:

Example 3

A household refrigerator of the float-chamber type was charged with 400 cc. of lubricating oil, 570 grams methyl chloride, and 11.2 gms. of allyl alcohol. The refrigerant was measured and transferred from the machine to the test room as in Example 1 to produce a concentration of 0.1% by volume of methyl chloride in the air. Two observers entered the room and made independent records of the sensation experienced, as shown below:

Within two minutes the presence of the refrigerant with its accompanying odorant became known to both observers by an irritation of the nose. In about ten minutes one was affected by a desire to sneeze and the other by a nasal discharge. Within twenty minutes nasal irritation and discharge, a desire to sneeze, and irritation of the eyes was experienced.

Example 4

A methyl chloride concentration of 0.2% by volume was produced in the air of the test room by removing vapor from the refrigerating machine of Example 3.

Four observers entered the room, two of whom ("C" and "D") where entirely unaware of what symptoms would be experienced. The other two ("A" and "B") had made, only a short time before, the observations recorded in Example 3. The results were as follows:

In two minutes all observers experienced nasal irritation and within four minutes the nasal irritation was pronounced strong and three observers felt irritation of the eyes. The warning was unpleasantly strong in all cases in less than ten minutes.

Allyl alcohol is soluble in methyl chloride in all proportions. It is not completely miscible in lubricating oil. However, if methyl chloride be present the solubility in lubricating oil is increased. Thus, 0.8 part of allyl alcohol dissolves in a mixture of 50 parts of oil and 25 parts methyl chloride. Allyl alcohol melts at $-50°$ C. so that it could not possibly cause stoppage by freezing in the expansion valve.

Tests made to determine the effect of allyl alcohol on samples of iron, brass and copper, showed that under conditions similar to those found in operation of a refrigerating system, for instance, dissolved in a refrigerant grade of methyl chloride, corrosion of these metals was very small.

No evidence of corrosion was found in refrigerating machines operated with methyl chloride containing allyl alcohol.

The stability of this warning agent under normal operating conditions is shown by the fact that a machine operated satisfactorily for over 60 days with a charge cantaining 4 parts of weight of allyl alcohol to 100 parts methyl chloride, a higher concentration than is required for warning purposes. Any instability of the allyl alcohol would be expected to cause the formation of resinous polymers, which would clog the valves and cause abnormal operation.

Further evidence that the allyl alcohol is stable in an operating refrigerating system was secured by making a test like that described in Examples 1 and 2, using methyl chloride withdrawn from the above mentioned machine after it had operated for 68 days. The warning effect was full as powerful as that obtained in tests where the machines have operated for only two days before testing.

Claims:

1. A composition of matter comprising a relatively inodorous refrigerant containing allyl alcohol in amounts suitable for warning purposes.

2. A composition of matter comprising a relatively inodorous refrigerant containing 1% to 4% allyl alcohol.

3. A composition of matter comprising a relatively inodorous refrigerant containing 2% of allyl alcohol.

4. A composition of matter comprising a refrigerant of the group comprising hydrocarbons and halogenated hydrocarbons containing allyl alcohol in proportions suitable for warning purposes.

5. A composition of matter comprising a refrigerant of the group comprising hydrocarbons and halogenated hydrocarbons containing 1% to 4% allyl alcohol.

6. A composition of matter comprising a refrigerant of the group comprising hydrocarbons and halogenated hydrocarbons containing about 2% allyl alcohol.

7. A composition of matter comprising methyl chloride containing allyl alcohol in amounts suitable for warning purposes.

8. A composition of matter comprising a refrigerating grade of methyl chloride containing 1% to 4% allyl alcohol.

9. A compositon of matter comprising a refrigerating grade of methyl chloride containing about 2% allyl alcohol.

Signed at Niagara Falls in the county of Niagara and State of New York this 26th day of December A. D. 1929.

CHARLES ROBERTS HARRIS.
ARTHUR L. PITMAN.